United States Patent
Chen et al.

(10) Patent No.: US 10,896,330 B1
(45) Date of Patent: Jan. 19, 2021

(54) ELECTRONIC DEVICE, INTERACTIVE INFORMATION DISPLAY METHOD AND COMPUTER READABLE RECORDING MEDIUM

(71) Applicant: Wistron Corporation, New Taipei (TW)

(72) Inventors: Chih-Ming Chen, New Taipei (TW); Ming-Hsien Lin, New Taipei (TW); Yen-Chuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/594,101

(22) Filed: Oct. 7, 2019

(30) Foreign Application Priority Data

Jul. 29, 2019 (TW) .............................. 108126783 A

(51) Int. Cl.
*G06F 3/14* (2006.01)
*G06K 9/00* (2006.01)
*G06Q 30/02* (2012.01)

(52) U.S. Cl.
CPC ....... *G06K 9/00671* (2013.01); *G06F 3/1423* (2013.01); *G06Q 30/0251* (2013.01)

(58) Field of Classification Search
CPC ....... G06F 3/14; G06Q 30/025; G06Q 30/026
See application file for complete search history.

(56) References Cited

U.S. PATENT DOCUMENTS

| 10,101,885 | B1* | 10/2018 | Dand ..................... G06F 3/1454 |
| 2008/0094417 | A1* | 4/2008 | Cohen ................... A63F 13/332 |
| | | | 345/632 |
| 2015/0106200 | A1 | 4/2015 | Elmekies |
| 2016/0224300 | A1* | 8/2016 | Kwon ................... G06F 16/583 |

FOREIGN PATENT DOCUMENTS

TW          M557857         4/2018

OTHER PUBLICATIONS

"Office Action of Taiwan Counterpart Application", dated May 29, 2020, p. 1-p. 12.

* cited by examiner

*Primary Examiner* — Joseph R Haley
(74) *Attorney, Agent, or Firm* — JCIPRNET

(57) ABSTRACT

An electronic device configured to display interactive information is provided, including a communication device, a camera, an input device, a processor and a display. The camera acquires an input image including an image of a display device, and the display device displays an interactive image including a default interaction option. The processor generates a virtual option according to the interactive image and superimposes the virtual option on the input image. The default interaction option and the virtual option correspond to a designated device and a designated service, respectively. The display is configured to display the input image and the virtual option. The processor determines whether the default interaction option or the virtual option is enabled when the input device receives an input operation, so as to provide the designated service in the designated device corresponding to the enabled default interaction option or virtual option.

19 Claims, 5 Drawing Sheets

ELECTRONIC DEVICE, INTERACTIVE INFORMATION DISPLAY METHOD AND COMPUTER READABLE RECORDING MEDIUM

CROSS-REFERENCE TO RELATED APPLICATION

This application claims the priority benefit of Taiwan application serial no. 108126783, filed on Jul. 29, 2019. The entirety of the above-mentioned patent application is hereby incorporated by reference herein and made a part of this specification.

BACKGROUND OF THE INVENTION

1. Field of the Invention

The present invention generally relates to an information display technology, in particular, to an interactive information display method and an electronic device thereof.

2. Description of Related Art

In areas where there are many intersections, business districts, restaurants, etc., advertisers often use video walls as a main measure of advertising or providing guidance information. As a device that is open to the public, in general, a video wall mostly uses a one-way push way to display information to a user. Or, some video walls use a two-way interaction way to display information, but all types of operations of the user will be directly fed back to the video walls. In this way, there is no privacy for the operations of the user. If the user wants to record the information displayed on the video wall, the user can only memorize it by himself/herself or record it with a medium and the like. Or, the user can also inquire about the information on the video wall with a mobile phone on his/her own, and then acquire derivative information of the corresponding video wall with the mobile phone. However, the derivative information on the mobile phone will be independent from the video wall without connection.

SUMMARY OF THE INVENTION

The embodiment of the present invention provides an interactive information display method and an electronic device thereof, so as to allow a user to operate information and options on a display device through the electronic device, so that the information on the electronic device and the information on the display device interact with each other.

The embodiment of the present invention provides an electronic device for displaying interactive information. The electronic device comprises a communication device, a camera, an input device, a processor and a display. The communication device is configured to transmit and receive information. The camera acquires an input image, and the input image comprises an image of the display device. The display device displays an interactive image comprising a default interaction option. The input device receives an input operation. The processor is connected with the communication device, the camera and the input device, generates a virtual option according to the interactive image, and superimposes the virtual option on the input image. The default interaction option and the virtual option correspond to a designated device and a designated service, respectively. The display is connected with the processor, and is configured to display the input image and the virtual option. When the input device receives the input operation, the processor determines whether the default interaction option or the virtual option is enabled, so as to provide the designated service in the designated device corresponding to the enabled default interaction option or virtual option.

The embodiment of the present invention provides an interactive information display method, comprising the following steps: acquiring an input image, wherein the input image comprises an image of a display device, and the display device displays an interactive image comprising a default interaction option; generating a virtual option according to the interactive image, and superimposing the virtual option on the input image, wherein the default interaction option and the virtual option correspond to a designated device and a designated service, respectively; receiving an input operation, and determining, according to the input operation, whether the default interaction option or the virtual option is enabled; and providing the designated service in the designated device corresponding to the enabled default interaction option or virtual option.

The embodiment of the present invention provides a computer readable recording medium, which stores a program. When the program is loaded and executed by a computer, an interactive information display method is completed.

Based on the above, according to the interactive information display method, the electronic device and the computer readable recording medium, a user interacts with the display device on the electronic device. Therefore, the user not only operates the information on the display device through the electronic device, but also extends the information on the display device onto the electronic device, so as to display additional and more private information.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
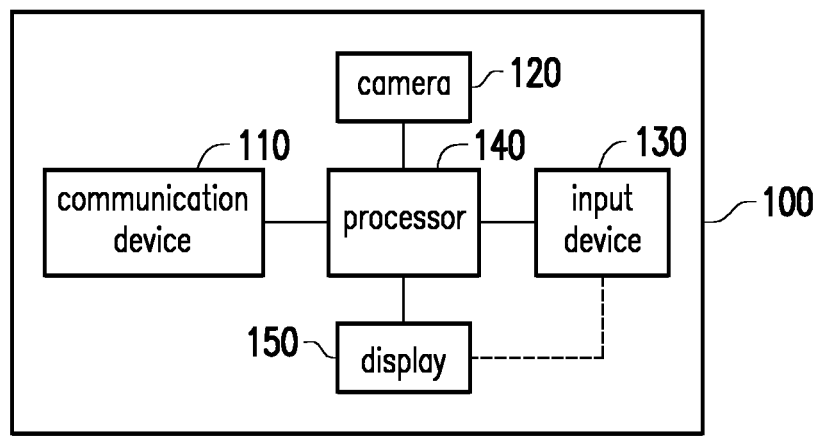
FIG. 1 illustrates a schematic diagram of an electronic device according to one embodiment of the present invention.

FIG. 1 illustrates a schematic diagram of an electronic device according to one embodiment of the present invention. Referring to FIG. 1, in one embodiment of the present invention, an electronic device 100 is provided with a communication device 110, a camera 120, an input unit 130, a processor 140 and a display 150.

The communication device 110 is configured to transmit and receive various types of information. In the embodiment of the present invention, the communication device is implemented by using a communication chip, and the communication chip is a component that supports signal transmission of a Global System for Mobile communication (GSM), a Personal Handy-phone System (PHS), a Code Division Multiple Access (CDMA) system, a Wideband Code Division Multiple Access (WCDMA) system, a Long Term Evolution (LTE) system, a Worldwide interoperability for Microwave Access (WiMAX) system, a Wireless Fidelity (Wi-Fi) system or a Bluetooth.

The camera 120 is configured to capture various types of images, and is, for example, a front lens or a rear lens mounted on an outer housing of the electronic device 100, or a camera 120 connected in series through a connection port (for example, a universal serial bus) or the communication device 110 (for example, a Bluetooth communication device), and the present invention is not limited thereto.

The input device 130 is configured to receive an input operation. In one embodiment of the present invention, the input device 130 is, for example, a touch panel, a mouse, and a touch screen combined with the display 150, and the present invention is not limited thereto.

The processor 140 is connected with the communication device 110, the camera 120 and the input device 130. The processor 140 is configured to perform various types of operations required by the electronic device 100. In one embodiment of the present invention, the processor 140 is, for example, a Central Processing Unit (CPU), a microprocessor, an Application Specific Integrated Circuit (ASIC), a Programmable Logic Device (PLD) or other similar devices.

The display 150 is configured to display various types of images and information for a user to read. The display 150 is, for example but not limited to, an organic light emitting diode display, a light emitting diode display, a resistive touch screen combined with the input device 130, a capacitive touch screen and a wave touch screen, but the invention is not limited thereto.

In the present embodiment, the electronic device 100 is, for example but not limited to, a mobile phone, a tablet computer, a notebook computer and a wearable device. Any one of various types of electronic equipment with the above-mentioned communication device 110, camera 120, input device 130, processor 140 and display 150 is applied to the present invention. In addition, the electronic device 100 needs to be firstly provided with an interactive information display program, and the processor 140 displays interactive virtual information by cooperation of the communication device 110, the camera 120, the input device 130, the processor 140 and the display 150 when loading and running an interactive virtual information display program.

Figure 2:
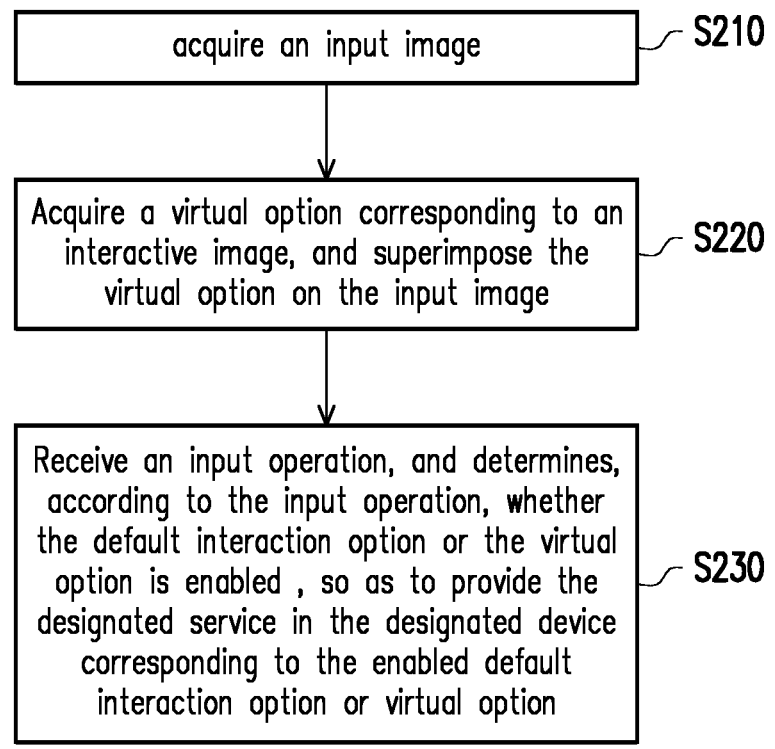
FIG. 2 illustrates a flowchart of an interactive information display method according to one embodiment of the present invention.

FIG. 2 illustrates a flowchart of an interactive information display method according to one embodiment of the present invention. The interactive information display method of the present embodiment is at least applicable to the electronic device illustrated in FIG. 1. One embodiment of the present invention will be described with reference to FIGS. 1 and 2 at the same time. The interactive information display method is completed by the electronic device 100 to display details of the interactive virtual information.

In Step S210, the camera 120 acquires an input image. In one embodiment of the present invention, the input image is a dynamic image. The input image is, for example but not limited to, acquired by the camera 120. However, the camera 120 captures only a picture of each lens without capturing and storing the input image into a hard disk as a photo. The input image includes an image of the display device, and the display device displays an interactive image including a default interaction option. In the present embodiment, the display device is illustrated by a video wall. The interactive image displayed on the video wall is a movie trailer, a commercial, a catering recommendation, a fashion show and the like. The default interaction option is, for example, an option for switching between the movie trailer, the commercial, the catering recommendation and the fashion show or for watching more pictures, purchasing cell phones, feeding back faults and the like, and the present invention is not limited thereto. That is, the picture of the interactive image being played on the video wall is watched in the input image. It is worth mentioning that in other embodiments, the display device is also an interactive machine for guiding users to brands on all floors and instructing guideposts, but the present invention is not limited thereto.

In Step S220, the processor 140 acquires a virtual option corresponding to the interactive image, and the virtual option is superimposed on the input image. Specifically, the virtual option is, for example, a booking link, a purchase link, a path guidance and the like, and the present invention is not limited thereto.

Specifically, the processor 140 firstly splits an image, belonging to the display device, in the input image by means of the input image, and identifies a device identification tag corresponding to the display device according to the image of the display device, thereby acquiring device information belonging to the display device, output image information and the virtual options. The device information is, for example, the position information, model number and size of the display device. The output image information is, for example, a designated output image, a resolution of the output image and a layout configuration, but the present invention is not limited thereto. The virtual options are a plurality of preset different options corresponding to virtual objects of the designated output image, such as "model agency", "clothing material" and "purchase information". It is worth mentioning that in one embodiment of the present invention, the input image includes a complete image of the entire display device, and the processor 140 finds features belonging to the display device according to the image of the display device, thereby identifying the device identification tag corresponding to the display device. In other embodiments of the present invention, developers also add a mark (for example, a two-dimensional bar code) to the display device at random or to a fixed position of the display device, or superimpose the mark on an interactive video to enable the processor 140 to identify the device identification tag corresponding to the display device through the image of the display device, but the present invention is not limited thereto.

After identifying the device identification tag of the display device, the processor 140 acquires the device information of the display device, the output image information and the virtual option according to the device identification tag of the display device. Specifically, the processor 140 is connected to an external server to acquire the device information, the output image information and the virtual option which correspond to the device identification tag of the display device. Alternatively, the processor 140 also prestores the device information, the output image information and the virtual option which correspond to a plurality of device identification tags into the electronic device 100, so that when acquiring the device identification tag corresponding to the display device, the processor 140 compares the device identification tags stored in the electronic device 100, thereby acquiring the device information of the display device, the output image information and the virtual option, but the present invention is not limited thereto.

The default interaction option and the virtual option correspond to respective designated devices and designated services, respectively. The designated devices and the designated services refer to devices that are configured to reflect that the default interaction option or the virtual option is enabled and functions provided by the devices. For example, if the default interaction option is "see more pictures", the designated device is the "display device", and the designated service is "display all pictures of the #2019 Fashion Show"; and when "see more pictures" is enabled, the display device will display all the pictures of the #2019 Fashion Show. If the virtual option is "magnify the object", the designated device is the "display device", and the designated service is "magnify the object corresponding to this virtual option in the display device"; and when the "magnify the object" corresponding to a commodity A is enabled, the commodity A in the display device will be magnified and displayed. If the virtual option is "move the object", the designated device is the "display device", and the designated service is "move the object corresponding to this virtual option"; and when the "move the object" corresponding to a commodity B is enabled, the processor 140 records a drag track received by the input device 130 to enable the commodity B to move in accordance with the drag track in the display device. If the virtual option is "display the price", the designated device is the "electronic device", and the designated service is "display the price of the object corresponding to this virtual option". In the present embodiment, the designated device and the designated service which correspond to each of the default interaction options and each of the virtual options are changed according to the needs of the developers. In general, since the default interaction option is displayed on the video wall to allow the user to operate the video wall, the designated device where the default interaction option is selected is also a video wall, but the present invention is not limited thereto. In addition, the present invention also does not limit the contents of the default interaction options and the virtual options. For example, if the developers think that the option "see more pictures" is better suitable to appear in the virtual option, the developers place the option "see more images" in the virtual option.

It is worth mentioning that in another embodiment of the present invention, the designated device corresponding to the default interaction option is a display device, and the designated device corresponding to the virtual option is the electronic device 100. Or, in another embodiment of the present invention, the developers also firstly define the privacy of each interaction option and each virtual option. An option with low privacy is a default interaction option, and is directly displayed on the video wall and operated by the user on the video wall. An option with high privacy is a virtual option, and is operated by the user on the electronic device 100.

In addition to the virtual options, the processor 140 also generates other virtual tags. For example, the price of clothing is placed next to every model on a fashion show. Furthermore, options for interacting with the interaction tags are added into the virtual options, such as switch the currency.

The present invention is not limited to the above-mentioned ways, and distinguishing methods for allowing the developers to further separate the default interaction option from the virtual option according to any needs are applied to the present invention without exceeding the scope of this description. It should be noted that the default interaction option and the virtual option which are described herein are both described by the number 1. However, in actual applications, there is a plurality of default interaction options and virtual options, and the present invention is not limited thereto.

In the present embodiment, the processor 140 identifies a portion, belonging to the interactive image, in the input image to generate a virtual option corresponding to an object in the interactive image, and superimposes the corresponding virtual option into the input image. The details will be described below.

After the virtual option is superimposed on the input image, the display 150 displays both the input image and the virtual option. In other words, if the user directly watches the display device, the user sees the interactive image including the default interaction option. If the input image is captured by the electronic device 100 (i.e., including an environmental image and the image of the display device), the user sees the virtual option, included in the interactive image displayed by the display device and superimposed on the interactive image, in the input image when watching the display 150, thereby achieving an Augmented Reality (AR) effect.

In Step S230, the input device 130 receives an input operation, and the processor 140 determines, according to the input operation, whether the default interaction option or the virtual option is enabled, so as to provide the designated service in the designated device corresponding to the enabled default interaction option or virtual option. Specifically, in the embodiment of the present invention, the input operation generates an input signal, for example, after the user clicks any position in a touch screen formed by combining the input device 130 and the display 150 to allow the input device 130 to detect the touch action of the user, or after the user clicks any position of the display 150 with a mouse, or the like, and the present invention is not limited thereto. After one of the default interaction option and the virtual option is enabled, the designated device corresponding to the enabled default interaction option or virtual option further provides the designated service. Details of how to determine, according to the input operation, whether the default interaction option or the virtual option is enabled will be described below.

Figure 3:
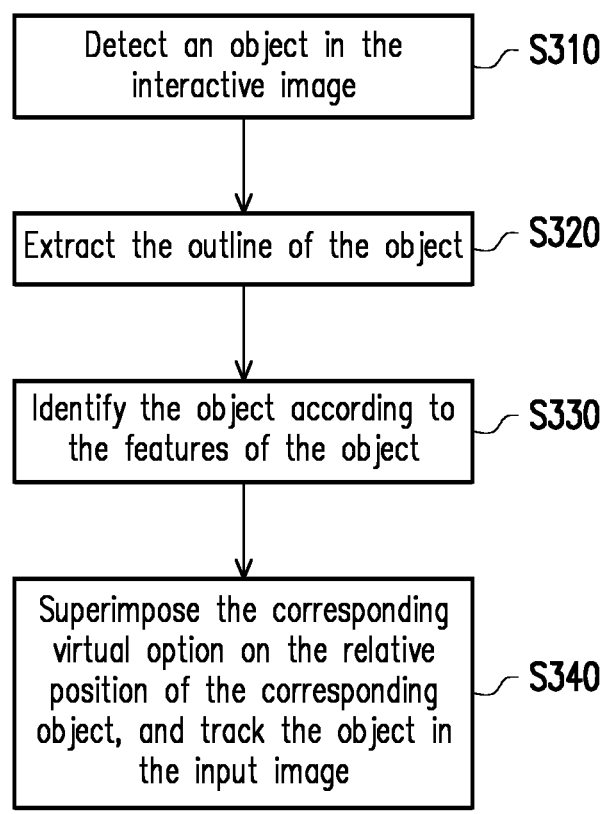
FIG. 3 illustrates a detailed flowchart of the interactive information display method of FIG. 2.

FIG. 3 illustrates a detailed flowchart of the interactive information display method of FIG. 2. Referring to FIG. 3, the details of how to generate the virtual option according to the interactive image will be described below with reference to FIGS. 1 to 3.

In Step S310, the processor 140 detects an object in the interactive image. In one embodiment of the present invention, the object detection is performed by using the algorithm of Yolo v3, but the present invention is not limited thereto. For example, if there is at least one vase in the interactive image, the processor 140 frames the vase as a detection frame to obtain a detection result, but the present invention is not limited thereto.

In Step S320, the processor 140 extracts the outline of the object. That is, the processor 140 cuts out the actual outline of the vase from the detection frame established in Step S310. Therefore, the processor 140 effectively removes the background of the object and eliminates noise to improve the identification accuracy. In one embodiment of the present invention, a semantic segmentation model for extracting the outline of the object is, for example, DenseNet, but the present invention is not limited thereto.

In Step S330, the processor 140 identifies the object according to the features of the object. Specifically, in the present embodiment, each object corresponds to at least one object identification tag, and the object identification tag is, for example, a code of the object. A service provider respectively sets a tag and an option which correspond to each object according to the object identification tag. For example, the price, purchase link, entity storefront navigation and the like corresponding to each object are set. Furthermore, the service provider also sets the tag corresponding to the object and a display position of the option relative to the object, and the present invention is not limited thereto. The processor 140 identifies internal features of the object, such as the pattern, the mouth size and the height of the vase, so as to find the corresponding object identification features according to the features of the object. In one embodiment of the present invention, the model for identifying the object is, for example, ResNet, but the present invention is not limited thereto. Details of using ResNet to identify the object will be described below.

In Step S340, the processor 140 superimposes the corresponding virtual option on the relative position of the corresponding object, and tracks the object in the input image. That is, the processor 140 superimposes an option corresponding to the object identification tag on the object (e.g., the display position relative to the object) as the virtual option. Furthermore, in order to continuously superimpose virtual options on the dynamic input image on the display 150, the processor 140 continuously tracks every object. Based on this, even if the object moves, the virtual option is also continuously displayed at the relative position of the corresponding object. If the processor 140 loses the object in the tracking process, the processor 140 re-executes the steps S310 to S340.

Figure 4:
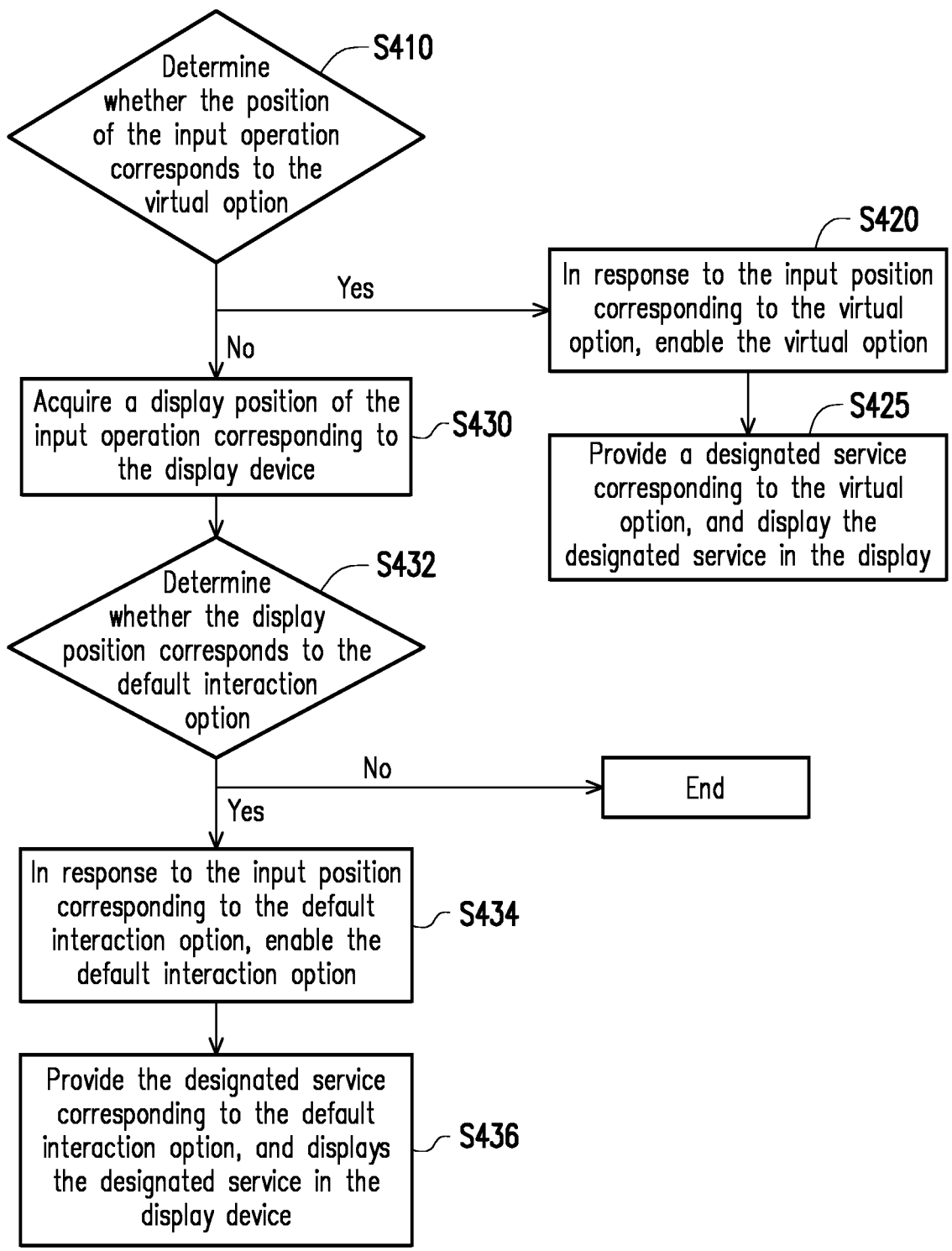
FIG. 4 illustrates a detailed flowchart of the interactive information display method of FIG. 2.

FIG. 4 illustrates a detailed flowchart of the interactive information display method of FIG. 2. Referring to FIG. 4, the details of how to determine whether the default interaction option or the virtual option is enabled according to the input operation will be described below with reference to FIGS. 1 to 4. It should be noted that in FIG. 4, the designated device corresponding to the virtual option is the electronic device, and the designated device corresponding to the default interaction option is the display device, but the present invention is not limited thereto.

In Step S410, the processor 140 determines whether the position of the input operation corresponds to the virtual option. In response to the input position corresponding to the virtual option, in Step S420, the processor 140 enables the virtual option. Furthermore, in Step S425, the processor 140 provides a designated service corresponding to the virtual option and displays the designated service in the display 150.

However, if the processor 140 determines in Step S410 that the position of the input operation does not correspond to the virtual option, the processor 140 acquires in Step S430 a display position of the input operation corresponding to the display device. In the present embodiment, the processor 140 acquires a position mapping relation between the image of the display device and the display device according to the image of the display device and the device information of the display device, thereby acquiring the display position of the input operation on the display device according to the position of the input operation and the position mapping relation. Specifically, a rectangular display device is taken as an example. An outer frame of the display device body is composed of four right angles. However, in the input image acquired by the camera 120, a standing position of the user has deviations in horizontal and vertical directions, and components of the camera 120 inherently have limitations in physical properties and structure, causing that the image, corresponding to the display device, in the input image deforms to different extents, for example, the image of the display device in the input image is displayed as a trapezoid. Therefore, the processor 140 firstly acquires the position mapping relation. In one embodiment, the processor 140 acquires the coordinates, corresponding to the four angles of the display device, in the image of the display device, and then obtains the position mapping relation according to length and width information and resolution information of the display device in the device information. However, the present invention is not limited thereto.

In Step S432, the processor 140 determines whether the display position corresponds to the default interaction option. If the display position does not correspond to the default interaction option, the process is ended, and the processor 140 does not perform any action according to the input operation.

If the processor 140 determines in Step S432 that the display position corresponds to the default interaction option, in Step S434 in response to the display position corresponding to the default interaction option, the processor 140 enables the default interaction option. Moreover, in Step S436, the processor 140 provides a designated service corresponding to the default interaction option and displays the designated service in the display device.

Figure 5:
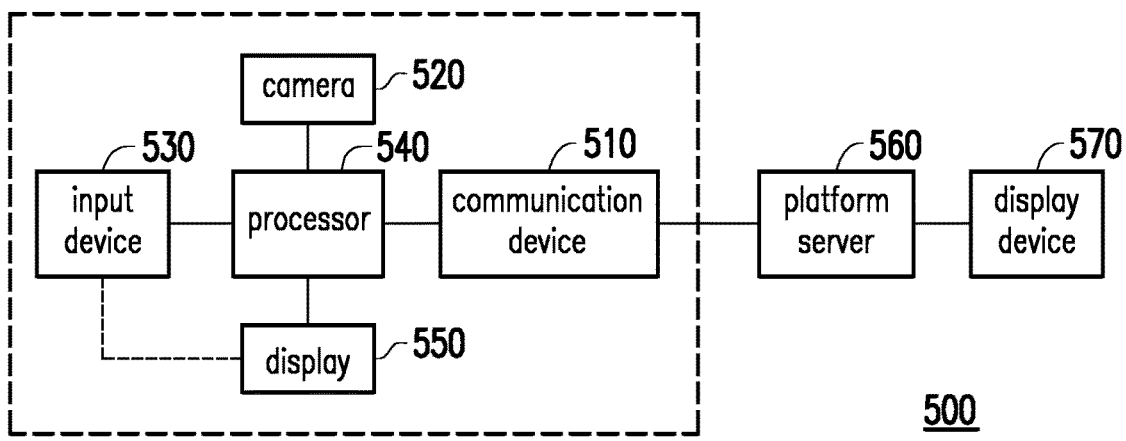
FIG. 5 illustrates a schematic diagram of an electronic device according to another embodiment of the present invention.

FIG. 5 illustrates a schematic diagram of an electronic device according to another embodiment of the present invention. Referring to FIG. 5, in one embodiment of the present invention, the electronic device 500 includes a communication device 510, a camera 520, an input device 530, a processor 540 and a display 550 which are the same as the communication device 110, the camera 120, the input device 130, the processor 140 and the display 150 of the electronic device 100 of FIG. 1, and descriptions of these components are omitted herein. The electronic device 500 is also provided with a platform server 560 and a display device 570 in addition to the above-mentioned components.

Figure 6:
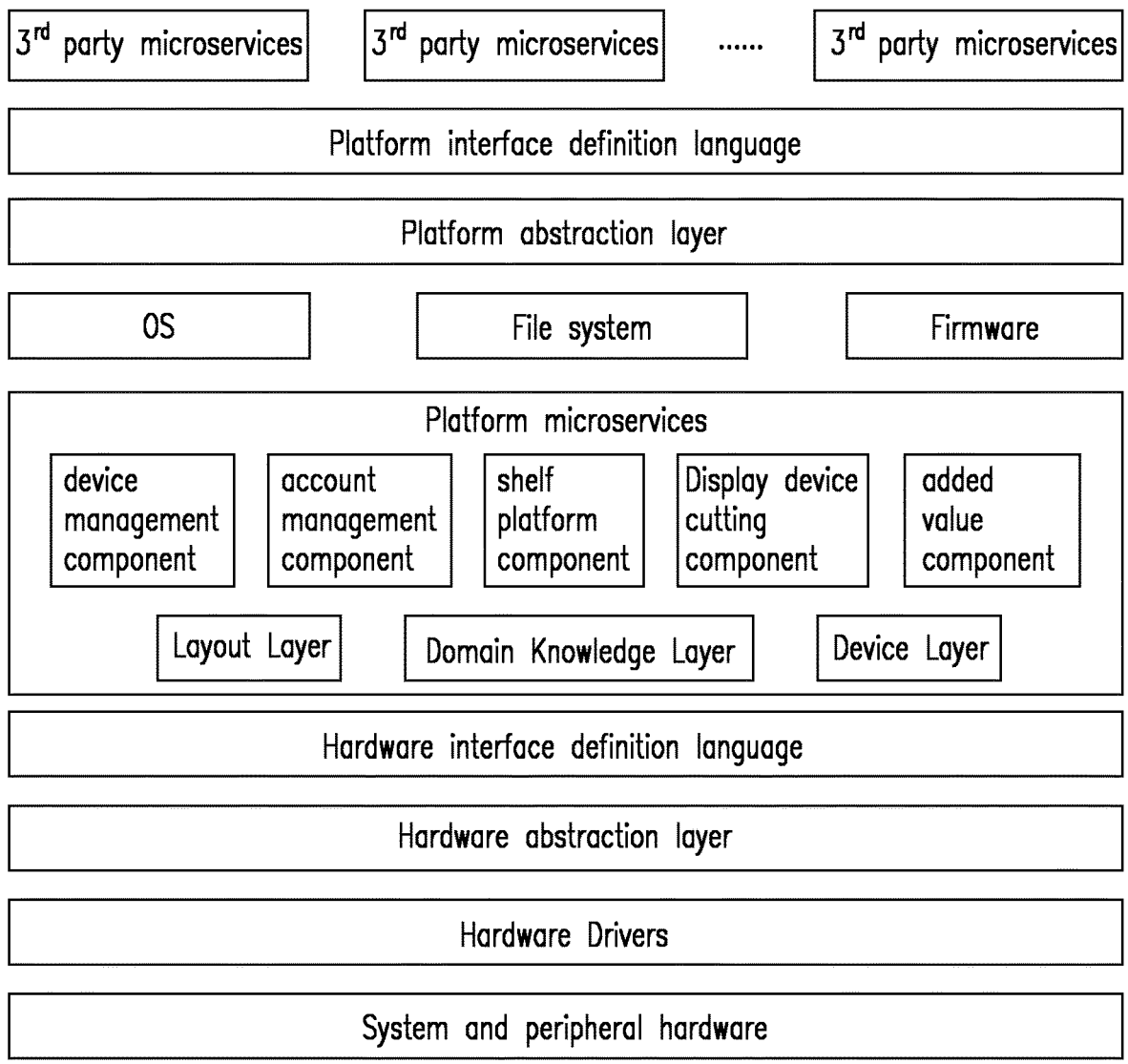
FIG. 6 illustrates a structural schematic diagram of a platform server 560 according to one embodiment of the present invention.

The platform server 560 is in communication connection with the communication device 510. Referring to FIG. 6, FIG. 6 illustrates a structural schematic diagram of the platform server 560 according to one embodiment of the present invention. The architecture of the platform server 560 of the present invention includes a platform interface definition language, a platform abstraction layer, platform microservices, an operating system, a file system, firmware, a hardware interface definition language, a hardware abstraction layer, hardware drivers, and systems and peripheral hardware.

Specifically, a $3^{rd}$ party microservice is provided by an Independent Software Vendor (ISV). In one embodiment of the present invention, the $3^{rd}$ party microservice is built in the platform server 560, or the $3^{rd}$ party microservice is also built in its own server by the ISV, and the present invention is not limited thereto.

The platform microservices provide a plurality of different service categories. When the $3^{rd}$ party microservice sends a request to the platform microservices, a corresponding service category is provided for the $3^{rd}$ party microservice. In the present embodiment, the service categories of the platform microservices are, for example but not limited to, a device management component, an account management component, a display device cutting component, a shelf platform component and an added value component.

The device management component is configured to set the display device 570. When the display device 570 needs to be initialized, the display device 570 applies for the service of the device management component through the $3^{rd}$ party microservice. The device management component provides an assemblable style to set the display device accordingly.

The account management component manages the authority of a user and provides an access authority for platform management and customized service contents. In the present embodiment, the account management component provides at least two different authorities: a general administrator belonging to a management end and a user authority belonging to a consumer end, but is not limited thereto.

The display device cutting component is configured to provide a layout of an image. Specifically, the display layout of the display device 570 is adjusted according to the design during installation. For example, the display device 570 is arranged in a display mode of diamond, parallelogram or circle, and the like. At this time, the display device cutting component provides a tool and a template corresponding to the display layout, so that the user easily cuts the image and determines a display situation of each block.

The shelf platform component is configured to provide a tool for the ISV to develop the $3^{rd}$ party microservice. Specifically, the shelf platform component provides, for example, a designed picture cutting function, an advertisement shelf function, a marketing activity design function and a software development tool.

The added value component provides other additional service categories, such as an online live broadcast service, and ISV uses these services at an additional fee during development, but the present invention is not limited thereto.

The service categories provided by the platform microservices are not limited to the above, and any service categories capable of enhancing the setting and added value of the display device 570 in a layout layer, a domain knowhow layer and a device layer shall all be applicable to the present invention. The layout layer, the domain knowhow layer and the device layer will be described below together with the display device 570.

The platform interface definition language and the platform abstraction layer serve as communication bridges between the $3^{rd}$ party microservice and the platform microservices. Specifically, since the $3^{rd}$ party microservice and the platform microservices use different program languages and compiling methods, the platform interface definition language and the platform abstraction layer convert a language applicable to the $3^{rd}$ party microservice into a language applicable to the platform microservices to increase the flexibility of development.

In addition, the platform server 560 is also provided with the operating system, the file system and the firmware, and drives the systems and peripheral hardware to operate through the hardware interface definition language, the hardware abstraction layer and the hardware drivers, so as to provide the above-mentioned all service categories.

The display device 570 is connected to the platform server 560, and is configured to receive and display services and images which are provided by the platform server 560. The display device 570 is, for example but not limited to, a video wall, an interaction device for providing floor guidance or various types of information and the like. In one embodiment of the present invention, the display device 570 is formed by splicing a plurality of display panels, and the spliced display panels play one picture together. Compared with a conventional video wall, the video wall has the advantages that when the platform microservices provided by the platform server 560 is used through the $3^{rd}$ party microservice, the display device 570 provides the settings of the layout layer, the domain knowhow layer and the device layer and displays the value-added service categories, thereby increasing the commercial value of the display device 570.

Specifically, the layout layer means that the display device 550 has various types of splicing methods, and accordingly, the user cuts the image through the display device cutting component or zooms in and zooms out the image. The image subjected to cutting adjustment is applied to the layout layer.

The domain knowhow layer means that the display device 570 is applied in a plurality of different domains, such as an advertising company, a footwear industry, a clothing industry and a hotel industry. In another embodiment, the domain knowhow layer further stores a display setting corresponding to a specific domain or a playback setting corresponding to a specific object. That is, people of various domains shelve the domain-related contents by the help of the shelf platform component and the added value component, and the domain-related contents are displayed in the display device 570.

The device layer means that various types of devices (such as mobile phones and tablet computers) all display interactive information on the electronic device 500 through the display 550.

In the present embodiment, the display device 570 pre-deploys an interactive information application program applicable to the display device 570 to cause the display device 570 to cooperate with the $3^{rd}$ party microservice.

In the present embodiment, the electronic device 500 completes the interactive information display method as shown in FIGS. 2 to 4 through the cooperation of the communication device 510, the camera 520, the input device 530, the processor 540, the display 550, the platform server 560 and the display device 570. Details of the operation of the electronic device 500 will be described below with reference to FIGS. 2 to 5 at the same time.

Firstly, referring to FIGS. 2 and 5, in Step S210, the camera 520 acquires an input image. The processor 540 firstly splits the image of the display device from the input image, and transmits the image of the display device in the input image to the platform server 560 via the communication device 510.

In Step S220, the platform server 560 acquires a virtual option corresponding to the interactive image, and the virtual option is superimposed on the input image, and the superimposed virtual option and input image are fed back and displayed in the display 550.

Specifically, the platform server 560 identifies a device identification tag corresponding to the display device according to the image, split from the input image, of the display device and the image of the display device, thereby acquiring device information belonging to the display device, output image information and the virtual option. The platform server 560 identifies a portion, belonging to the interactive image, in the input image to superimpose a corresponding virtual option on a relative position to the object in the interactive image in the input image. The platform server 560 feeds back the input image subjected to virtual option superimposition to the communication device 510 for displaying the input image in the display 550.

In Step S230, the input device 530 receives an input operation, and the processor 540 determines, according to the input operation, whether the default interaction option or the virtual option is enabled, so as to provide the designated service in the designated device corresponding to the enabled default interaction option or virtual option. Details of how to determine whether the default interaction option and virtual option are enabled according to the input operation will be described below.

Continuously referring to FIGS. 3 and 5, in the embodiment of FIG. 5, the platform server 560 generates the virtual option based on the interactive image. That is, in Step S310, the platform server 560 detects an object in the interactive image. In Step S320, the platform server 560 extracts the outline of the object. In Step S330, the platform server 560 identifies the object according to the features of the object. In Step S340, the platform server 560 generates the corresponding virtual option according to the object and tracks the object. It is worth mentioning that in addition to the virtual option, the platform server 560 also tracks the object in the interactive image in the same way, and superimposes the default interaction option on the object in the interactive image. The details of the operation of the electronic device 500 from Step S310 to Step S340 are the same as the details of the operation of the electronic device 100 from Step S310 to Step S340, and the descriptions thereof are omitted herein.

Continuously referring to FIGS. 4 and 5, details of how the electronic device 500 determines whether the default interaction option or the virtual option is enabled according to the input operation will be described below.

In Step S410, the processor 540 determines whether the position of the input operation corresponds to the virtual option. If the input position corresponds to the virtual option, in Step S420, the processor 540 enables the virtual option in response to the input position corresponding to the virtual option. At this time, the processor 540 provides the designated service corresponding to the virtual option, or the processor 540 also transmits a service request to the platform server 560 through the communication device 510 to ask the platform server 560 to provide the designated service corresponding to the virtual option. In Step S425, the platform server 560 provides and transmits the designated service corresponding to the virtual option to the communication device 510 and displays the designated service in the display 550.

However, if the processor 540 determines in Step S410 that the position of the input operation does not correspond to the virtual option, the processor 540 transmits the input position of the input operation corresponding to the display and the input image to the platform server 560. In Step S430, the platform server 560 acquires a position mapping relation between the image of the display device in the input image and the display device 570, and acquires the display position of the input operation on the display device 570. Specifically, the processor 540 sets coordinates to a display region of the display, and determines coordinate points of the input operation relative to the display 550 as the display position of the input operation. Furthermore, the processor 540 transmits the position of the input operation and the input image to the platform server 560. Similar to the foregoing embodiment, the image, corresponding to the display device, in the input image deforms to different extents. Therefore, it is necessary to know the position mapping relation between the image of the display device and the display device 570. The difference is that the platform server 560 acquires the position mapping relation in the present embodiment. Since the display device 570 needs to log in and be registered in the platform server 560 at first, the platform server 560 stores the device information of the display device 570, and acquires the position mapping relation according to the device information and the input image. The details of acquiring the position mapping relation according to the device information and the input image are the same as those of the foregoing embodiments, and the descriptions thereof are omitted herein.

By the position mapping relation, the platform server 560 converts the coordinate points of the input operation relative to the display 550 to the display position of the corresponding display device 570, thereby determining whether the input operation corresponds to the default interaction option.

In Step S432, the platform server 560 determines whether the display position corresponds to the default interaction option. If the display location does not correspond to the default interaction option, the process is ended, and the platform server 560 does not perform any action according to the input operation.

If the platform server 560 determines in Step S432 that the display position corresponds to the default interaction option, the platform server 560 determines in Step S434 in response to the input position corresponding to the default interaction option, enable the default interaction option. Furthermore, in Step S436, the platform server 560 provides the designated service corresponding to the default interaction option, and displays the designated service in the display device 570.

Figure 7:
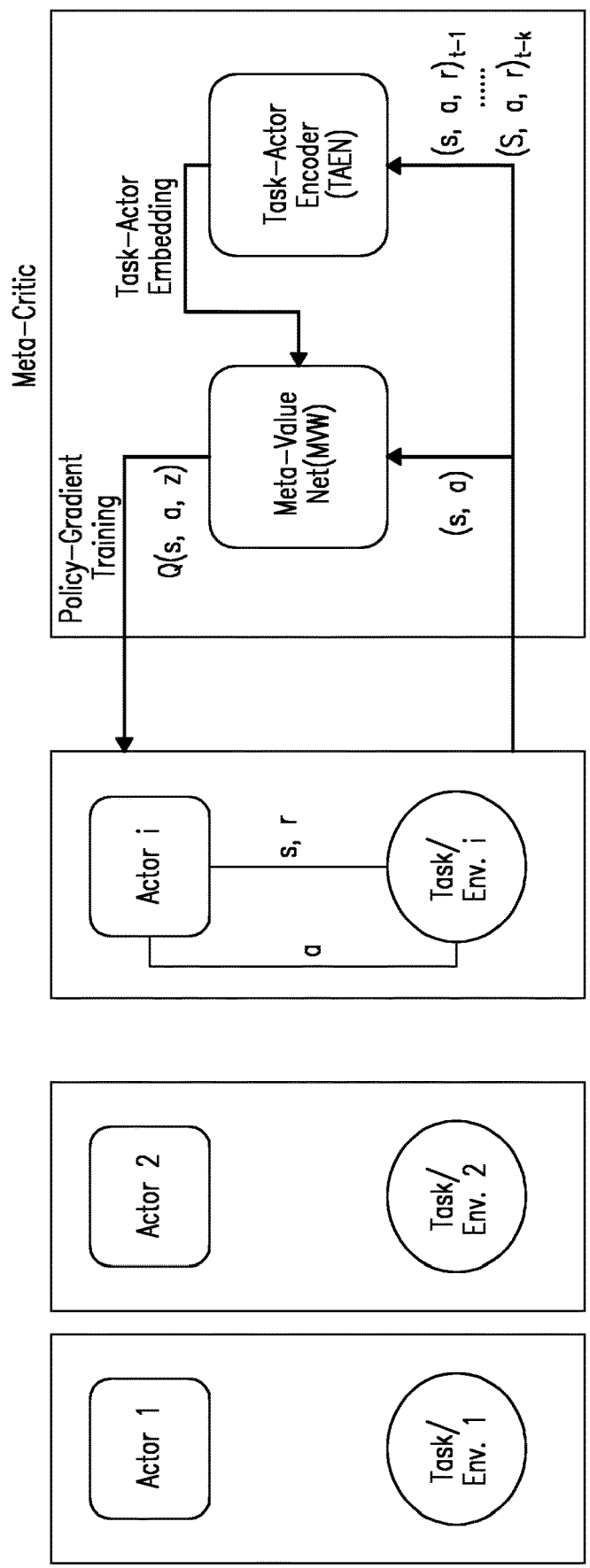
FIG. 7 illustrates a schematic diagram of a ResNet model according to one embodiment of the present invention.

FIG. 7 illustrates a schematic diagram of a ResNet model according to one embodiment of the present invention. Referring to FIG. 7, in the ResNet model, learning is performed using a meta learning Meta-Critic method. In the meta learning Meta-Critic method, an input is an actor.

Each actor includes inputting a hyperparameter a, completing a task Task/Env. with the hyperparameter a, and generating a corresponding evaluation result (s, r). By inputting the hyperparameter a and the evaluation result (s, r) which correspond to each actor into the meta learning Meta-Critic, meta learning Meta-Critic finds a hyperparameter applicable to the learning model according to the evaluation result (s, r) acquired by the conventional use of the various types of hyperparameters. That is, the meta learning Meta-Critic is a way to learn how to design a learning model. In other words, the meta learning Meta-Critic is regarded as a way of guessing how to learn by oneself through the learning experience of predecessors. The hyperparameters acquired by the meta learning Meta-Critic method is applied to object identification. That is, during the object identification, a hyperparameter of the ResNet model applicable to an object to be identified is firstly acquired through the meta learning Meta-Critic, so as to set the learning model according to the hyperparameter and then identify the object to be identified according to the set learning model.

In one embodiment of the present invention, a computer readable recording medium is also provided. The computer readable recording medium stores a program, and when a computer loads and executes the program, the method of any one of claims 14 to 18 is completed. For example, when the computer loads and executes the program, the technical content of the above embodiment is completed.

Possible application situations of the electronic device 500 in actual life will be described below.

[First Application Situation]

Taiwan covers a small area, and the rent is extremely high. Therefore, an entity store does not have enough space to display commodities. At this time, a plurality of commodities is simultaneously displayed on the display device 570 through the electronic device 500, and consumers watch the display device 570 through an own mobile phone and directly purchase a commodity. For example, a picture of the display device 570 is divided into nine regions corresponding to commodities 1 to 9, and options (default interaction options) such as "see more", "magnify the commodity" and "rotate to the left" are simultaneously displayed in each region. In addition, if a consumer watches the display device 570 through the own mobile phone, the mobile phone displays the prices and "buy" (virtual interaction options) next to the commodities 1 to 9 respectively. The consumer clicks "magnify the commodity" in the region of the commodity 1 on the mobile phone. At this time, the commodity 1 is magnified through the platform server 560 in the region, corresponding to the commodity 1, on the display device 570. If the consumer clicks "buy" at the position of the commodity 1 on the mobile phone, at this time, the mobile phone sends a purchase request to the platform server 560, and the platform server 560 transmits a two-dimensional bar code back and displays the two-dimensional bar code on the mobile phone. The consumer only needs to scan the two-dimensional bar code through the display device 570 or other specific machines to pay, and the commodity 1 will be delivered through the logistics. Or, after the consumer clicks "buy", the mobile phone sends a request of entering a purchase website to the platform server 560 and displays the purchase website of the commodity 1 on the mobile phone.

In this way, the store is converted into a shopping medium, and a real object is directly sent by a warehouse after the payment is completed, thereby saving the expenses of opening a store.

[Second Application Situation]

The display device 570 is divided into an upper region, a middle region and a lower region.

The display device 570 displays a map in the upper region, and when the map is read through the mobile phone, a consumer flow status of each store is displayed on the mobile phone. For example, if the store is red, it indicates that there are many people.

The display device 570 displays an advertisement billboard, a coupon or a promotion, and the like based on the crowd attribute in the middle region. Moreover, when the advertisement billboard is read through the mobile phone, corresponding information, including download links, the amounts, comments, designer names, or the last visit time of a user and the like, is displayed according to different advertisement types.

The display device 570 displays information in the lower region according to operations of the upper region or the middle region. For example, if the user clicks a store in the map in the upper region, store information will be displayed in the lower region. Or, if the user clicks an advertisement of the middle region, corresponding advertisement information will be displayed in the lower region. In the lower region, more default interaction options and virtual interaction options are displayed, such as navigation and booking.

In this way, for a shopping mall, related information and activities which are applicable to this shopping mall are pushed for users, and the commodities in the shopping mall are extended. In addition, the cost of marketing activities of a store is also reduced.

It is worth mentioning that multiple people use and operate the electronic device 500 simultaneously, whether in the first situation, the second situation, or all other types of situations using the present invention. Therefore, if the display device 570 receives input operations from a plurality of users, causing the display device 570 to be requested to provide designated services, the display device 570 further provides a plurality of display panes in the interactive image at this time. Each display pane corresponds to one input operation and provides the corresponding designated service. Or, the display device 570 only provides the designated service corresponding to the first received input operation. Or, the display device 570 starts to count down a designated time (for example, 60 seconds and 180 seconds) when receiving the second input operation, so that the display device 570 provides the designated services to the plurality of users in turn. The present invention is not limited thereto.

Based on the above, according to the interactive information display method, the electronic device and the computer readable recording medium which are provided by the present invention, the user interacts with the display device on the electronic device. Therefore, the user not only operates the information on the display device, but also extends the information on the display device onto the electronic device, so as to display additional and more private information. In addition, since a correct position of the display device is acquired through the device identification tag of the display device, the information on the display device and the corresponding virtual options and virtual tags linked to the electronic device all provide a local guidance and sales promotion to improve the information transfer effect and the advertising benefit. Furthermore, after the platform server is built, the ISV self-develops and shelves various types of information through the platform server, and people of the various domains make advertising or provide all types of services through the display device, so as to improve the flexibility of information displaying. For a provider end of the platform server, it only needs to focus on the building and maintenance of the platform server. For the user, the present invention not only provides a novel operating experience, but also allows the user to further obtain more in-depth information on interested portions while the user watches the various types of information displayed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, configured to display interactive information, comprising:
   a communication device, configured to transmit and receive information;
   a camera, configured to acquire an input image, wherein the input image comprises an image of a display device, and the display device displays an interactive image comprising a default interaction option;
   an input device, configured to receive an input operation;
   a processor, connected with the communication device, the camera and the input device, and configured to acquire a virtual option corresponding to the interactive image and superimpose the virtual option on the input image, wherein the default interaction option and the virtual option correspond to a designated device and a designated service, respectively;
   a display, connected with the processor, and configured to display the input image and the virtual option,
   wherein in response to the input device receives the input operation, the processor determines whether the default interaction option or the virtual option is enabled to provide the designated service in the designated device corresponding to the enabled default interaction option or virtual option, wherein the input operation corresponds to an input position of the display, and the processor is also configured to:

determine whether the input position corresponds to the virtual option;

in response to the input position corresponding to the virtual option, enable the virtual option; and in response to the input position not corresponding to the virtual option, acquire a display position of the input operation corresponding to the display device, and determine whether the display position corresponds to the default interaction option.

2. The electronic device according to claim 1, wherein the processor is also configured to:

detect an object in the interactive image;

extract the outline of the object;

identify the object according to the features of the object; and superimpose the corresponding virtual option onto a relative position to the corresponding object, and track the object in the input image.

3. The electronic device according to claim 1, wherein the processor is also configured to:

extract an image, belonging to the display device, in the input image;

identify a device identification tag corresponding to the display device according to the image of the display device; and acquire device information of the display device, output image information and the virtual option according to the device identification tag.

4. The electronic device according to claim 3, wherein the processor is also configured to:

in response to the display position corresponding to the default interaction option, enable the default interaction option.

5. The electronic device according to claim 4, wherein the processor is also configured to:

acquire a position mapping relation between the image of the display device and the display device according to the image, belonging to the display device, in the input image and the device information of the display device; and acquire the display position of the input operation corresponding to the display device according to the input position and the position mapping relation.

6. The electronic device according to claim 1, further comprising:

a platform server, connected with the communication device, wherein the communication device transmits the interactive image to the platform server;

the platform server detects an object in the interactive image, extracts the outline of the object, identifies the object according to the features of the object, superimposes the corresponding virtual option or the default interaction option on the object, and tracks the object.

7. The electronic device according to claim 6, wherein the processor transmits a service request to the platform server in response to determining that the virtual option is enabled, and the service request corresponds to the designated service of the virtual option;

the platform server provides the designated service corresponding to the virtual option according to the service request, and the processor displays the designated service in the display.

8. The electronic device according to claim 6, wherein the processor also transmits the image, belonging to the display device, in the input image to the platform server through the communication device;

the platform server identifies a device identification tag corresponding to the display device according to the image of the display device, and acquires device information of the display device, output image information and the virtual option according to the device identification tag.

9. The electronic device according to claim 8, wherein the input operation corresponds to an input position of the display; and the processor determines whether the input position corresponds to the virtual option, and enables the virtual option in response to the input position corresponding to the virtual option;

the processor transmits the input position to the platform server in response to the input position does not correspond to the virtual option;

the platform server acquires a display position of the input operation corresponding to the display device according to the input position, and determines whether the display position corresponds to the default interaction option;

the platform server determines whether the display position corresponds to the default interaction option, and enables the default interaction option in response to the display position corresponding to the default interaction option.

10. The electronic device according to claim 9, wherein the platform server acquires a position mapping relation between the image of the display device and the display device according to the image, belonging to the display device, in the input image and the device information of the display device, and acquires the display position of the input operation corresponding to the display device according to the input position and the position mapping relation.

11. The electronic device according to claim 8, further comprising:

the display device, connected with the platform server, wherein the platform server transmits a signal of the interactive image to the display device, so that the display device plays the interactive image.

12. The electronic device according to claim 9, wherein when the virtual option is enabled, the processor provides the designated service corresponding to the virtual option, and displays the designated service in the display, or, the processor transmits a service request to the platform server according to the designated device and designated service of the virtual option, so that the platform server provides the designated service, and the processor displays the designated service in the display.

13. The electronic device according to claim 11, wherein when the default interaction option is enabled, the platform server provides the designated service corresponding to the default interaction option, and displays the designated service in the display device.

14. An interactive information display method, comprising:
- acquiring an input image, wherein the input image comprises an image of a display device, and the display device displays an interactive image comprising a default interaction option;
- acquiring a virtual option corresponding to the interactive image, and superimposing the virtual option on the input image, wherein the default interaction option and the virtual option correspond to a designated device and a designated service, respectively;
- receiving an input operation, and determining, according to the input operation, whether the default interaction option or the virtual option is enabled; and
- providing the designated service in the designated device corresponding to the enabled default interaction option or virtual option,
- wherein the input operation corresponds to an input position of a display corresponding to an electronic device, and the step of receiving the input operation, and determining, according to the input operation, whether the default interaction option or the virtual option is enabled also comprises:
- determining whether the input position corresponds to the virtual option;
- in response to the input position corresponding to the virtual option, determining that the virtual option is enabled; and
- in response to the input position not corresponding to the virtual option, acquiring a display position of the input operation corresponding to the display device, and determining whether the display position corresponds to the default interaction option.

15. The interactive information display method according to claim 14, wherein the step of acquiring the virtual option corresponding to the interactive image, and superimposing the virtual option on the input image comprises:
- detecting an object in the interactive image;
- extracting the outline of the object;
- identifying the object according to the features of the object; and
- superimposing the corresponding virtual option onto a relative position to the corresponding object, and tracking the object.

16. The interactive information display method according to claim 14, wherein the step of acquiring the virtual option corresponding to the interactive image also comprises:
- extracting an image, belonging to the display device, in the input image;
- identifying a device identification tag corresponding to the display device according to the image of the display device; and
- acquiring device information of the display device, output image information and the virtual option according to the device identification tag.

17. The interactive information display method according to claim 16, wherein the step of receiving the input operation, and determining, according to the input operation, whether the default interaction option or the virtual option is enabled also comprises:
- in response to the display position corresponding to the default interaction option, determining that the default interaction option is enabled.

18. The interactive information display method according to claim 17, wherein the step of acquiring the display position of the input operation corresponding to the display device, and determining whether the display position corresponds to the default interaction option also comprises:
- acquiring a position mapping relation between the image of the display device and the display device according to the image, belonging to the display device, in the input image and the device information of the display device; and
- acquiring the display position of the input operation corresponding to the display device according to the input position and the position mapping relation.

19. A non-transitory computer readable recording medium, configured to store a program, wherein when a computer loads and executes the program, the method according to claim 14 is completed.

* * * * *